PRESSURE SENSITIVE TRANSFER COATING

Joseph L. Shank, 4110 206th St., Matteson, Ill. 60443
No Drawing. Filed Oct. 12, 1970, Ser. No. 80,209
Int. Cl. B41m 5/22
U.S. Cl. 117—36.2
11 Claims

ABSTRACT OF THE DISCLOSURE

The invention provides a record material sensitized with acidic electron acceptors and a dye transfer layer comprising a leucoauramine dye homogeneously distributed throughout an inert hot melt layer plasticized such that the dye can be easily transferred to the acidic electron acceptor layer for marking without transfer of the hot melt.

---

This invention relates to improvements in pressure-sensitive record material useful in duplicating or other operations. More particularly, the invention concerns hot melt formulations and substrates coated with such formulations in which a transfer layer is structured to substantially reduce smudging during handling of the substrates but which, in no way, interferes with the desired transfer characteristics.

Various systems are known for the transfer of an image by pressure. The direct transfer of pigment (carbon paper) has several advantages, one being that the pigment, as distinguished from dyes, is generally not sensitive to pH changes and, hence, acid fumes or other chemicals in the atmosphere or the composition of the receiving web do not affect the quality of the carbon transfer. However, pigmented coatings adhere to the foundation sheet with so little tenacity that the slightest abrading or rubbing action or pressure on the sheet will cause the coating to be transferred off the sheet either onto the surface causing the transfer or to an adjacent medium.

In an attempt to overcome various objections to the use of so-called "carbon paper" and the like duplicating papers, pigmented coatings have been applied to the underside of a writing or typing sheet. Obviously, pigment layers are colored and the pigment must be masked with large amounts of kaolin or other ingredients if one desires white or pale colored paper. Kaolin and other ingredients will substantially lighten the color of the pigment transfer sheet but will detrimentally affect the copy capability of the sheet.

In order to avoid the problems and disadvantages of pigment transfer systems, there have been devised systems wherein the chromogen is colorless while in a transfer layer but forms a color when contacted with a receptor layer due to a pH change, an oxidation step or both. Leuco dyes such as those mentioned in U.S. Pats. Nos. 2,981,733 and 2,981,738 as well as others have performed very satisfactorily in such systems.

In preparing the transfer sheet containing a leuco dye, two general methods have been used. In the encapsulation process, a dye is dissolved in an oil, such as cottonseed or soybean oil and coacervates or microcapsules are formed with ionizable hydrophilic colloidal systems usually of gelatin and gum arabic. The walls of these microcapsules are impermeable to the oil but are easily ruptured by the application of localized pressures. Such microcapsules, dispersed in a suitable binding material, are then coated onto one surface of a web material and the article dried. Alternatively, an oil containing the dye may be emulsified in a suitable liquid film-forming material, the resulting emulsion coated on the web material and the web dried. A major disadvantage of emulsion systems is that quite often one must add a basic buffering agent to the emulsion to maintain the pH of the system suitable to prevent a premature color reaction.

In the encapsulation and emulsion processes, a separate drying step to drive off the water is required. Curling is known to take place when aqueous coatings are applied to cellulosic substrates and the films deposited thereon are relatively thick.

Also, in emulsion systems, the emulsion is an oil-in-water emulsion, the outer, external or continuous phase of the emulsion being the aqueous colloidal sol and the internal or dispersed phase being the oil solution of dye or dye-forming agent. When the emulsion is deposited on a sheet of paper to produce a continuous film thereupon, the dispersed droplets of oily material often tend to migrate into the paper by capillary action. Quite often, the opposite surface of the paper is coated with material which will react with the oily material to produce a color so that, if the oily material is absorbed through the paper, it will come into contact with the opposite surface of the paper to form a color, thus substantially destroying the utility of the paper.

In certain prior art systems, pigments and dyes are usually suspended in oils and waxes and some wax is transferred along with the pigment when pressure is applied to the transfer sheet. The particular disadvantage of transferring wax to the receiving sheet is that the characters are waxy and hence have the inability to accept printing, ballpoint or other inks so that copies cannot be readily corrected or annotated except by the interpositioning of a transfer sheet which is often inconvenient.

According, it is one object of this invention to produce pressure-sensitive sheet material of white or very pale color which remains so even for long periods of storage.

It is another object of this invention to provide a pressure-sensitive sheet material which upon localized pressure will squeeze out the dye for reaction with an acidic receptor sheet without the transfer of substantial amounts of wax.

Additional objects, if not specifically set forth herein will be readily apparent to those skilled in the art from a reading of the detailed description of the invention which follows.

In general, the invention comprises hot melt formulations and pressure-sensitive transfer sheets having a flexible precoat layer and a leucoauramine dye containing transfer layer adjacent said precoat layer. The dye transfer layer comprises a leucoauramine dye homogeneously distributed throughout an inert hot-melt layer plasticized such that the dye can be easily transferred to an acidic substrate for marking without the transfer of the hot melt. The hot melt can be modified so that a predetermined amount of pressure will cause the dye to transfer. While the invention is directed mainly to the coating of paper, it should be realized that other flexible webs may be used. These include plastics, felts, leather, metalfoil, etc. In one preferred embodiment of the invention, a flexible sheet substrate is provided wherein a leuco dye transfer layer comprising a hot melt is on one surface of the substrate and on the other surface for mating with the dye transfer layer of another substrate is a dye receiving layer.

Leuco dyes are sensitive to moisture, pH changes and oxidation. A leuco dye in the transfer layer directly adjacent the substrate will tend to react with atmospheric gases absorbed into the paper or with materials in the substrate itself and, hence, a precoat is normally used. It has been found that a precoat of about .05 to about 1 mil of a water soluble substance, usually gums or low gram strength protein material, gives good results. In forming the precoat composition, aqueous solutions of protein material such as animal glue, gelatin, casein, and alpha soy protein (with a binder) in an amount of about 10%–45% by weight, and $TiO_2$ in an amount of 0%–15% by weight are combined in an aqueous system. That is, sufficient water is added to total 100%. The precoat must be inert in regard to leuco dyes and it must be flexible. It provides a pH barrier and a moisture barrier so the dye does not prematurely change color. Another useful precoat formula consists of synthetic film such as about ½%–5% carboxyl methyl cellulose and 5%–30% soy protein by weight with the rest water.

In forming the transfer layer, alkane type hot melts, i.e., waxes modified with high molecular weight polyethylenes, will provide a sufficiently hard film (usually less than 1 mil) which will guard against smudging. In general, the polyethylenes will posses a molecular weight of between about 10,000 and 50,000 preferably 15,000–30,000 and quite often in the about 18,000–25,000 range. However, if the film is too hard, there will be very little transfer of dye upon localized pressure and hence the wax is usually modified with a plasticizer in amounts of about 5%–40%, based on the weight of the hot melt. The hot melt should be substantially straight chained aliphatics with not more than about 15% by weight being branched chain. This includes highly branched paraffins such as the microcrystalline waxes which should not be used in large amounts because they inactivate the dye or produce excessive migration of the dye. It is preferred to use paraffin wax, although synthetic and natural waxes can be used as long as they have a sufficiently low acid number, i.e., less than 5 and are inert in respect to the auramine dyes. The hot melt should have a melting point of at least 180° F. and usually about 190° F. to 260° F., preferably about 200° F.–240° F.

The paraffins can be identified by crystallinity, brittleness, translucency, hardness, relatively odorless, tasteless, white in color and of low oil content—not more than 1%. They are usually manufactured and marketed in a number of grades ranging in melting points from about 115° F. to about 165° F. For purposes of this invention, they should be modified with higher melting waxes and polymers such as the polyethylenes to produce a film that does not smudge or blotch when the paper is subjected to high temperatures.

In order to raise the melting point of the paraffin wax from the 160° F. to 165° F. range, high melting point wax modifiers in amounts of about 20% to 150%, based on the weight of the paraffin wax, can be added to give hard films having a melting point in the 190° F.–260° F. range. Best results have been obtained when the hot melt possesses a melting point of between about 200° F.–240° F. For example, carnauba, a vegetable wax characterized by exceptional hardness, may be added to the 160-165° F. paraffin wax. Polyethylenes such as Union Carbide's DYNH (low density polyethylene having an MW of about 22,000 and melt index of 2.0 at 190° C., gm./10 minutes) and Eastman Chemical Products Epolene C14 and C17 (polyethylenes of 30,000 and 18,000 molecular weight and melt index, 190° C., g./10 minutes of 1.4–2 and 17–23 respectively) can be used.

In forming the hot melt transfer layer, the hot melt plasticizer and leuco dye in an amount of between about .01%–1% basis total formulation are placed in a container and heated to a fluid consistency. Best results have been obtained when the dye is first dissolved in the plasticizer and the wax added to that solution. Generally speaking, the molten hot melt may be applied to the substrate using the techniques known in the industry for depositing hot melts. The particular advantage of the hot melt is that it sets up instantly upon contact with the paper and no drying step is required.

The leuco dyes which may be used in the practice of this invention are disclosed and described in U.S. Pat. No. 2,981,733 and U.S. Pat. No. 2,981,738, the disclosures of which are incorporated herein by reference. The dyes are known as derivatives of bis (p-dialkylaminoaryl) methane in which the nitrogen is linked to the methane carbon atom. These dyes have the general formula:

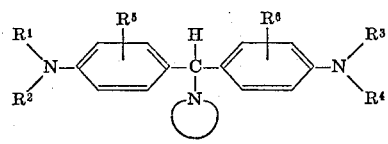

wherein:

Each $R^1$, $R^2$, $R^3$ and $R^4$ is a lower alkyl radical:
Each $R^5$ and $R^6$ is a member selected from the group consisting of hydrogen, lower alkyl, lower alkoxy, fluorine, chorine, bromine, dilower alkylamino, lower alkanoylamino and $—SO_2NH_2$;

$\overset{|}{N}$ represents a radical selected from the group consisting of heterocyclic radicals containing at least one double bond and saturated heterocyclic radicals which:

When said radical contains at least one double bond, is a member containing 5 to 6 ring members and 1 to 3 nitrogen atoms, the remaining ring atoms being carbon, said radical being selected from the group consisting of those which are free from substituents and those which contain 1 to 2 substituents selected from the group consisting of alkyl up to 18 carbon atoms, octadecenyl, cycloalkyl in which the ring contains 5 to 6 carbon atoms, lower alkyloxy, lower hydroxyalkyl, lower hydroxyalkoxy, phenyl-lower alkyl, mononuclear hydrocarbon aryl, mononuclear hydrocarbon aroxy, benzo, fluorine, chlorine, bromine, nitro, dilower alkylamino, lower alkanoylamino and $—SO_2NH_2$; and When said radical is saturated, is selected from the group consisting of pyrrolidino, piperidino, morpholino, thiomorpholino, hexamethylene imino, methylhexamethylene imino, heptamethylene imino and piperazino, at least one of the piperazino nitrogen atoms forming the linking point to the methane carbon atom of a bis (p-dialkylaminoaryl) methane having the herein defined formula

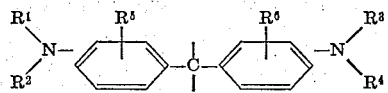

and substituted derivatives of pyrrolidino, piperidino, morpholino and piperazino in which the substituents are selected from the group consisting of alkyl up to 18 carbon atoms, octadecenyl, cycloalkyl and condensed cycloalkyl in which the rings contain 5 to 6 carbon atoms, lower alkyloxy, lower hydroxyalkyl, lower hydroxyalkoxy, phenyl lower alkyl, mononuclear hydrocarbon aryl, mononuclear hydrocarbon aroxy, fluorine, chlorine, bromine, nitro, dilower alkylamino, lower alkanoylamino and $—SO_2NH_2$.

Examples of such compounds inculde the following:

1-[bis(p-dimethylaminophenyl)methyl]-pyrrolidine
1-[bis(p-dimethylaminophenyl)methyl]-piperidine
1-[bis(p-diethylaminophenyl)methyl]-piperidine
4-[bis(p-dimethylaminophenyl)methyl]-morpholine
4-[bis-(p-diethylaminophenyl)methyl]-morpholine
1-[bis(p-dimethylmainophenyl)methyl]-piperazine
1-[bis(p-dimethylaminophenyl)methyl]-4-methylpiperazine
1-[bis(p-dimethylaminophenyl)methyl]-4-hydroxyethylpiperazine
1,4-bis[bis(p-dimethylaminophenyl)methyl]-piperazine
1,4-bis[bis(p-diethylaminophenyl)methyl]-piperazine
1-[bis(p-dimethylaminophenyl)methyl]-benzotriazole
1-[bis(p-dimethylaminophenyl)methyl]-3,5-dimethylpyrazole 1-[bis(p-dimethylaminophenyl)methyl]-benzimidazole
N-[bis(p-dimethylaminophenyl)methyl]-indole
N-[bis-(p-dimethylaminophenyl)methyl]-pyrrole
1-[bis(p-dimethylaminophenyl)methyl]-2-methyl-2-imidiazoline
N-[bis(p-dimethylaminophenyl)methyl]-carbazole As used herein, the term "lower," when used to describe a substituent, e.g., "lower alkyl" and "lower alkoxy," is intended to include straight and branched chain groups containing up to six carbon atoms.

If the film of the transfer layer is too hard there will be very little transfer of dye upon pressure and hence a non-bleeding, wax and polyethylene compatible, upon solidification, plasticizer can be incorporated into the hot melt dye formulation. The dialkyl esters of alkane dibasic acids of 6–10 carbons such as adipic, pimelic, suberic, azelaic and sebacic wherein the alkyl radical contains about 2–10 carbons can be used. Examples include dioctyl adipate, diisodecyl adipate, dihexyl adipate, didecyl adipate and hexyl octyl adipate.

Other suitable plasticizers are the alkyl, cycloalkyl and aryl esters of phthalic acid. The alkyl radical usually contains 2–10 carbons and such substituted phthalates include dimethyl phthalate, dibutyl phthalate, di-2-ethylhexyl phthalate, dioctyl phthalate, diisoctyl phthalate, dicyclohexyl phthalate, isooctyl, isodecyl phthalate, di-tridecyl phthalate, butyl octyl phthalate, butyl cyclohexyl, phthalate, hexyl octyl phthalate, normal decyl phthalate, butyl benzyl phthalate, and octyl benzyl phthalate.

Examples of other inorganic and organic acids which may be completely esterified to produce esters suitable as plasticizers include glutaric acid, lactic acid, glycollic acid, tartaric acid, citric acid, terephthalic acid, tetrahydrophthalic acid, tetrachlorophthalic acid, salicylic acid, benzoic acid and phosphoric acid, as well as the isomers and homologs of the above. Those which are poly basic acids or mono basic aromatic acids are unusually effective and particularly suitable esters include tributyl phosphate, tricresyl phosphate, dioctyl isophthalate, tributyl citrate and acetyl tributyl citrate.

Broad classes of plasticizers are contemplated and include the adipates, azelates, citrates, fumarates, lactates, laurates, maleates, oleates, palmitrates, phthalates, phosphates, ricinoleates, sebacates, stearates, epoxy plasticibers including epoxidized vegetable oils and plastoleins.

Other plasticizer compositions useful in the present invention comprise esters of high oxirane containing higher fatty acids with mono, di, and polyhydric aliphatic alcohols. These esters are low viscosity oils possessing little or no color. The esters may be characterized as high oxirane fatty materials containing a plurality of oxirane rings or epoxy groups at those points in the fatty acyl radical which are normally occupied by double bonds in the original nonepoxidized fatty acid or ester. They usually have an oxirane oxygen content of about 4.9–12.3, more often about 7.5–9.5. A general discussion of suitable oxirane fatty acid esters is set forth in U.S. Pats. Nos. 3,377,-304 and 2,978,463, the disclosures of which are hereby incorporated by reference. Specific plasticizers include epoxidized linseed oil (oxirane content 8–8.5% by weight), epoxidized soybean oil (oxirane content 7–7.5% by weight), epoxidized butyl esters of linseed oil fatty acids (oxirane content 7.2% by weight) and epoxidized octyl tallate (oxirane content 4.9% by weight).

In the preparation of the receptor sheet, an acidic clay may be suspended in a suitable carrier and binder such as cornstarch or carboxy methyl cellulose and the resultant slurry coated onto one surface of a web material such as paper to give a film less than about .5 mil. Alternatively, an acidic electron acceptor material may be dissolved in an oil medium and emulsified with water by means of surface active agents. After complete emulsification has occurred, the emulsion can be coated on one surface of a receptor web material and dried at a suitable temperature. The dried surface of the paper contains either microcapsules containing minute droplets of oil wherein the acid is dissolved or a film having entrapped therein minute oil droplets having dissolved therein an acid substance. In another embodiment, a carboxylic acid may be absorbed onto an inorganic mineral before it is incorporated onto the absorbent sheet.

In this connection it is brought out that it should be understood that sensitization of the opposite side of the transfer sheet, while preferred, is not absolutely essential to the invention. Preferred sensitizing agents are the acidic electron acceptors such as attapulgite, bentonite, kaolin, silica gel, felspar, pyrophyllite, halloysite, magnesium trisilicate, zinc sulphate, zinc sulfide, calcium fluoride, calcium citrate, and organic acids such as tannic acid and benzoic acid. The acidic clays may be treated with sulfuric acid to render them more reactant if desired.

In carrying out the practice of the invention as a step in the manufacturing of transfer paper, it is desirable to select finish paper stock commensurate with the end-use in mind (e.g., paper to be used for business forms) and pre-coat the paper with a barrier film. Good pre-coating formulations include inert film-forming material as described above. These include, refined glues and gelatins as well as casein, alpha soy protein and carboxy methyl cellulose. Non-reacting materials, such as $TiO_2$ and lithopone may be included.

A typical pre-coat formulation may comprise:

| | Grams |
|---|---|
| Technical protein colloidal (refined animal glue of 200 gram strength liquefied with urea) | 90 |
| $TiO_2$ | 10 |
| Water | 200 |

In forming pre-coat compositions an aqueous solution of a protein adhesive, i.e., glue, gelatin, casein, soy protein, etc., in amounts of about 10%–45% by weight and 0–15% by weight $TiO_2$ $CaCO_3$, lithopone or other non-reactive clays, basis total formulation, i.e., including water are quite sufficient. The ingredients are mixed and applied at about .05 to 1 mil or as a complete tub size.

After pre-coating or sizing, the paper is roller coated or curtin coated with the hot melt containing the leuco dye. The dye is dissolved in the alkane base formulae (paraffin hydrocarbons) which is then applied as a hot melt over the coating. The temperature of the hot melt at application depends on the formulation but is usually in the range of about 200–250° F.

The finished product has the unique advantage of being uniformly white until the treated surface is subjected to pressure by a stylus or a typewriter platen or other implement while in contact with the clay mating sheet whereupon the dye is allowed to contact the clay surface where it is converted to a colored marking of the same pattern as the applied pressure.

Examples of hot melt-dye-plasticizer formulations are set forth below. It is to be borne in mind that these examples are entirely for purposes of illustration and are not to be construed as placing limitations on the invention other than as set forth in the appended claims.

EXAMPLE I

| | Amount, percent |
|---|---|
| Paraffin wax, melting point 160/165° F. and viscosity of 40 SUS | 49.5 |
| Epolene C-17 (polyethylene wax modifier having approximate molecular weight of 18,000, softening point of 84° C. and melt index 190° C., g./10 minutes of 17–23) | 20.0 |
| Plasticizer (dioctyl phthalate) | 30.0 |
| Dye, 4[bis(p - dimethylaminophenyl)methyl]morpholine | .5 |
| | 100.0 |

EXAMPLE II

| | Amount, percent |
|---|---|
| Paraffin wax, melting point 160/165° F. and viscosity of 40 SUS | 49.5 |
| Epolene C-17 (polyethylene) | 40.0 |
| Plasticizer (dioctyl adipate) | 10.0 |
| Dye, 4[bis(p - diethylaminophenyl)methyl]morpholine | .5 |
| | 100.0 |

EXAMPLE III

| | Amount, percent |
|---|---|
| Paraffin wax, melting point 160/165° F. and viscosity 40 SUS | 40.5 |
| Synthetic paraffin (National Wax 6426), melting point 158/160° F., viscosity 55 SUS | 15.0 |
| Epolene C-17 (polyethylene) | 20.0 |
| Plasticizer (butyl benzyl phthalate) | 24.0 |
| Dye, 4[bis(p - dimethylaminophenyl)methyl]pyrrolidine | 0.5 |
| | 100.0 |

EXAMPLE IV

| | Amount, percent |
|---|---|
| Microcrystalline wax, melting point 153/158° F. and viscosity 76 SUS | 15.0 |
| Synthetic paraffin wax, melting point 158° F./160° F. | 52.5 |
| DYNH-1 (Union Carbide) polyethylene approximate MW of 22,000, melt index 190° C./gm./10 minutes of 2.0 | 12.0 |
| Plasticizer (dibutyl phthalate) | 20.0 |
| Dye, 4[bis(p - dimethylaminophenyl)methyl]morpholine | .5 |
| | 100.0 |

EXAMPLE V

| | Amount, percent |
|---|---|
| Carnauba wax | 15.0 |
| Synthetic paraffin wax, melting point 158/160° F. | 52.5 |
| Epolene C-17 (polyethylene) | 12.0 |
| Plasticizer (dioctyl phthalate) | 20.0 |
| Dye, 4[bis(p - diethylaminophenyl)methyl]morpholine | .5 |
| | 100.0 |

EXAMPLE VI

| | Amount, percent |
|---|---|
| Paraffin wax, melting point 160/165° F. and viscosity of 40 SUS | 40.0 |
| Epolene C-47 (polyethylene) | 39.5 |
| Plasticizer, Epoxol 9-5 (epoxidized linseed oil-oxirane oxygen content 9.2% weight) | 20.0 |
| Dye, 4[bis(p - dimethylaminophenyl)methyl]morpholine | .5 |
| | 100.0 |

EXAMPLE VII

| | Amount, percent |
|---|---|
| Paraffin wax, melting point 160/165° F. | 44.5 |
| Synthetic paraffin wax 6426 | 10.0 |
| Epolene C-14 (polyethylene wax modifier having MW of 30,000, softening point 92° C. and melt index 190° C./g./10 minutes of 1.4-2) | 20.0 |
| Plasticizer, Epoxol 5-2E (epoxidized octyl tallate-oxirane oxygen content of 4.9% by weight) | 25.0 |
| Dye, 4[bis(p - dimethylaminophenyl)methyl]morpholine | .5 |
| | 100.0 |

EXAMPLE VIII

| | Amount, percent |
|---|---|
| Paraffin wax, melting point 160/165° F. and viscosity 40 SUS | 39.0 |
| Epolene C-17 (polyethylene MW 18,000) | 20.0 |
| Plasticizer (dioctyl phthalate) | 40.0 |
| Dye, 4[bis(p - diethylaminophenyl)methyl]morpholine | 1.0 |
| | 100.0 |

EXAMPLE IX

| | Amount, percent |
|---|---|
| Paraffin wax, melting point 160/165° F., viscosity 40 SUS | 50.0 |
| Epolene C-17 (polyethylene) | 45.0 |
| Plasticizer (dihexyl adipate) | 4.9 |
| Dye, 4[bis(p - dimethylaminophenyl)methyl]morpholine | 0.1 |
| | 100.00 |

EXAMPLE X

| | Amount, percent |
|---|---|
| Paraffin wax, melting 190/195° F. | 34.5 |
| Epolene C-17 (polyethylene MW 18,000) | 20.0 |
| Polyethylene AC #8 (Allied Chemical), viscosity 350 cps @ 284° F. (140° C.) | 25.0 |
| Plasticizer (dioctyl adipate) | 20.0 |
| Dye, 4[bis(p - diethylaminophenyl)methyl]morpholine | .5 |
| | 100.0 |

Obviously many modifications and variations of the invention as hereinbefore set forth may be made without departing from the spirit and scope thereof, and, therefore, only such limitations should be imposed as are indicated in the appended claims.

I claim:

1. As an article of manufacture, a pressure-sensitive transfer sheet comprising a flexible sheet-like substrate having a pre-coat layer and transfer hot melt layer having a melting point in excess of about 190° F., comprising substantially straight chained aliphatics with not more than about 15% by weight being branched chain and containing paraffin wax having an acid number less than five, said wax having an oil content of not more than 1%, a polyethylene possessing a molecular weight of between about 10,000 and 50,000 in an amount of about 20% to about 150%, based on the weight of the paraffin wax, a substantially non-bleeding plasticizer and a leuco dye adjacent said pre-coat layer, said transfer layer containing the leuco dye homogeneously distributed throughout the hot metal layer and plasticized such that the dye can be easily transferred to a receptor substrate for marking without the transfer of substantial quantities of hot melt.

2. The article of claim 1 wherein the polyethylene possesses a molecular weight of about 15,000 to about 30,000 and has a viscosity of about 30 to 30,000 cps. at 140° C.

3. The article of claim 1 wherein the wax and polyethylene are present in an amount of about 60% to about 95% by weight, the plasticizer is present in an amount of about 5% to about 40% and the dye is a leucoaurarnine present in a small amount.

4. The article of claim 1 wherein the polyethylene has a molecular weight of between about 18,000 and 25,000, the plasticizer is an ester of phthalic acid or adipic acid and the dye is a heterocyclic derivative of bis(p-dialkylaminophenyl) methane in which a nitrogen of the heterocyclic is linked to the methane carbon atom.

5. The article of claim 1 wherein the plasticizer is selected from the group consisting of dibutylphthalate, dioctyl phthalate and butyl benzyl phthalate and the leuco dye is a heterocyclic substituted bis(p-dialkylaminophenyl) methane wherein the alkyl is 1 to 4 carbon atoms.

6. The article of claim 1 wherein the precoat layer is a proteinaceous material and the dye is a heterocyclic substituted bis(p-dialkylaminophenyl) methane.

7. The article of claim 1 wherein the dye is 4-[bis(p-dimethylaminophenyl]-morpholine.

8. The article of claim 1 wherein the transfer layer is plasticized with an ester of adipic acid in an amount of between about 5% and 40%, basis the weight of the layer.

9. The composition of claim 1 wherein the leuco dye is selected from the group consisting of 1-[bis(p-dimethylaminophenyl)methyl]-pyrrolidine,
1-[bis(p-dimethylaminophenyl)methyl]-piperidine,
1-[bis(p-diethylaminophenyl)methyl]-piperidine,
4-[bis(p-dimethylaminophenyl)methyl]-morpholine,
4-[bis(p-diethylaminophenyl)methyl]-morpholine,
1-[bis(p-dimethylaminophenyl)methyl]-piperazine,
1-[bis(p-dimethylaminoyphenyl)methyl]-4-methyl-piperazine,
1-[bis(p-dimethylaminophenyl)methyl]-4-hydroxyethylpiperazine,
1,4-bis[bis(p-dimethylaminophenyl)methyl]-piperazine, and
1,4-bis[bis(p-diethylaminophenyl)methyl]-piperazine.

10. The article of claim 1 wherein a dye receiving layer is on the other surface of said substrate for cooperation with the dye transfer layer of another similar sheet adapted to release the leuco dye without the transfer of hot melt to the dye receiving layer, said dye receiving layer comprising an acidic electron acceptor in sufficient amount to react with said dye to mark the layer.

11. In the method of transferring images from a transfer sheet to a receptor sheet, said receptor sheet comprising an acidic electron acceptor, the improvement comprising using combined sheets having a pre-coat layer and a transfer layer coated on one side of the substrate, said pre-coat layer being interposed between said substrate and said transfer layer, said transfer layer comprising a hot melt having a melting point in excess of about 190° F. and comprising substantially straight chained aliphatics with not more than about 15% by weight being branched chain and containing paraffin wax having an acid number less than five, said wax having an oil content of not more than 1%, a polyethylene possessing a molecular weight of between about 10,000 and 50,000 in an amount of about 20% to about 150%, based on the weight of the paraffin wax, a substantially non-bleeding plasticizer and a leuco dye such that the dye can be easily transferred to a receptor substrate for marking without the transfer of substantial quantities of hot melt, and said substrate being coated on the opposite side with an acid receptor layer, and applying local pressure to the combined sheets to effect a transfer of an image from a transfer sheet to a receptor sheet.

References Cited
UNITED STATES PATENTS

| | | | |
|---|---|---|---|
| 3,278,327 | 10/1966 | Davis | 117—36.2 |
| 2,949,381 | 8/1960 | Steinhardt | 117/36.2 |
| 2,885,302 | 5/1959 | Phillpotts | 117—36.2 |
| 3,488,207 | 1/1970 | Vassiliades | 117—36.2 |
| 2,927,041 | 3/1960 | Davis | 117—36.2 |
| 2,950,213 | 8/1960 | Streck | 117—36.2 |
| 3,193,404 | 7/1965 | Davis | 117—36.2 |
| 3,248,236 | 4/1966 | Raczynski et al. | 117—36.2 |

MURRAY KATZ, Primary Examiner

U.S. Cl. X.R.

117—36.4, 158, 161 H; 260—28.5 A, 41 C

UNITED STATES PATENT OFFICE
CERTIFICATE OF CORRECTION

Patent No. 3,684,549         Dated August 15, 1972

Inventor(s) JOSEPH L. SHANK

It is certified that error appears in the above-identified patent and that said Letters Patent are hereby corrected as shown below:

The patent should show on its face that it is assigned to Swift & Company of Chicago, Illinois.

Column 4, line 24 -- after 5, cancel "to" and substitute therefor -- or --;

Column 4, line 59 -- after compounds, cancel "inculde" and substitute therefor -- include --;

Column 5, line 44 -- after epoxy, cancel "plasticibers" and substitute therefor -- plasticizers --;

Column 7, line 54 -- after Epolene, cancel "C-47" and substitute therefor -- C-17 --;

Column 8, line 22 -- after melting, insert "point";

Column 8, line 53 -- after hot, cancel "metal" and substitute therefor -- melt --.

Signed and sealed this 6th day of March 1973.

(SEAL)
Attest:

EDWARD M. FLETCHER, JR.
Attesting Officer

ROBERT GOTTSCHALK
Commissioner of Patents